United States Patent [19]

Muhlfelder et al.

[11] 4,114,841
[45] Sep. 19, 1978

[54] MAGNETIC TORQUING SYSTEM FOR CHANGING THE SPIN RATE OF AN ORBITING SATELLITE

[75] Inventors: Ludwig Muhlfelder, Livingston; Robert Benson Hogan, Cinnaminson, both of N.J.

[73] Assignee: RCA Corporation, New York, N.Y.

[21] Appl. No.: 770,504

[22] Filed: Feb. 22, 1977

[51] Int. Cl.² ............................................. B64G 1/00
[52] U.S. Cl. ................................... 244/166; 364/453; 364/459
[58] Field of Search ................... 73/178 R; 235/150.2, 235/150.25; 244/3.2, 3.21, 164, 166, 171

[56] References Cited

U.S. PATENT DOCUMENTS

| | | | |
|---|---|---|---|
| 3,189,298 | 6/1965 | Buckingham et al. | 244/166 |
| 3,489,372 | 1/1970 | Ellis et al. | 244/166 |
| 3,534,925 | 10/1970 | Gatlin | 244/166 |
| 3,834,653 | 9/1974 | Perkel | 244/166 |

*Primary Examiner*—Stephen G. Kunin
*Attorney, Agent, or Firm*—H. Christoffersen; Joseph D. Lazar; Robert M. Rodrick

[57] ABSTRACT

The angular momentum of a tumbling orbiting satellite is changed to reduce the spinning of the spacecraft such that the spacecraft can operate in an essentially stabilized condition. The change in spin rate is accomplished by the development of a magnetic torque by commutation of magnetic air coils in response to earth sensor signals controlled by spacecraft logic. The coils are disposed to produce magnetic dipoles transverse to the satellite spin axis such that by interacting with the earth's magnetic field a torque is developed in a direction opposite the spin vector. The logic selects the proper magnetic dipole based upon data from sensors detecting the presence of the earth for the development of the desired magnetic torque.

18 Claims, 9 Drawing Figures

MAGNETIC TORQUING SYSTEM FOR CHANGING THE SPIN RATE OF AN ORBITING SATELLITE

BACKGROUND OF THE INVENTION

1. Field of the Invention

This invention relates to a system and a method for changing the angular momentum of a spacecraft by an automatic magnetic torquing system and more particularly to changing the spin rate of a tumbling orbiting satellite by a magnetic torque to restabilize the satellite.

2. Description of the Prior Art

In the operation of a stabilized orbiting satellite there is always a finite probability that an accident will occur which results in uncontrolled tumbling of the spacecraft. Such uncontrolled motion of a satellite, intended to be stabilized in orbit, renders the satellite effectively useless for its planned operation. Furthermore, prolonged tumbling at excessive angular momentum may jeopardize the structural integrity of the spacecraft as well as the spacecraft's thermal and power balance. Therefore, it is desirable that recovery of the satellite occur within a short period of time after tumbling begins.

"Detumbling" can be accomplished by mass expulsion devices such as, rocket thrusters or jets. The use of such devices to "despin" the tumbling spacecraft often requires excessive propellent usage. In the situation where no propellent is available, such means can not be used to restabilize the spacecraft. Where electrical power in the satellite is available, it is more desirable to detumble the spacecraft by changing the spacecraft's spin rate by an autonomous control system.

Magnetic torquing of stabilized satellites, in particular for changing the attitude of a spacecraft which has deviated from its desired orientation relative to its orbit, is known. Such magnetic torquing systems use a magnetic field from torquers such as coils or electromagnets to interact with the magnetic field of the earth to develop a reaction torque. This reaction torque causes the reference axis of the satellite to be reoriented an amount proportional to the torquing time and flux magnitude as is well known in the art. Magnetic torquing can also be used to develop a reaction torque to control the spin rate and the angular momentum of a spacecraft. These known magnetic torquing systems may be implemented in a satellite or spacecraft with an automatic (closed-loop) control system or an open-loop control system requiring command signals from a ground-situated station.

The problem with such open-loop control systems is that the ground station link in the control system necessitates delays in the correction operations by personnel who must interpret satellite signals and provide the appropriate and timely command signal. Such delays make it difficult to achieve corrections that are best made more frequently as the satellite becomes properly oriented in its earth orbit. The expense of operating ground stations with personnel serving to solve satellite attitude and momentum problems is also a burdensome disadvantage in such open-loop control systems.

Up to the present, most efforts for the automatic recovery of a tumbling satellite focused on the known magnetically torqued despin schemes which utilize suitably integrated and transformed gyro outputs, updated with data from earth sensors to provide a continuous spin phase reference for commutating magnetic coils disposed on the spacecraft or magnetometers utilized to sense the magnitude and direction of the earth's magnetic field to control coil commutation. Although feasible, such techniques are relatively complex and time consuming to implement and require considerable computer software and hardware capability.

Accordingly, a system for automatically recovering a tumbling spacecraft is needed to overcome the deficiencies of the presently known proposals and systems. Such an autonomous system, utilizing on-board hardware to produce a magnetic torque to "despin" the spacecraft, i.e., reduce the spin rate of the spacecraft along the spin axis, particularly when despinning cannot be accomplished by mass expulsion devices such as rocket thrusters, is desirable.

SUMMARY OF THE INVENTION

According to the present invention, a magnetic torquing system in a closed-loop system in a spacecraft orbiting a celestial body, the celestial body having an ambient magnetic field and preferably being the earth, is provided. Torquing means is included which is energized to produce a magnetic torque to automatically change the spacecraft angular momentum along the spin axis and thereby the spin rate of the spacecraft. Earth sensor means oriented on the spacecraft with the spacecraft spin axis substantially colinear with the line of sight axis of the sensor means generates an output signal in response to the detection of the earth. Logic means coupled to the sensor means generates in response to the sensor output signal a logic output signal representing a selected desired magnetic dipole configuration. Energizing means is suitably coupled to the logic means to generate in response to the logic output signal a signal for energizing the magnetic torquing means such that the magnetic dipole generated therefrom reacts with the magnetic field of the earth to produce a magnetic torque along the spin axis of the spacecraft to change the spacecraft angular momentum and thereby the spin rate of the spacecraft.

A method for magnetically torquing in a closed loop system an orbiting spacecraft to automatically change the spacecraft's angular momentum and thereby its spin rate is also included.

DETAILED DESCRIPTION OF THE PREFERRED EMBODIMENT

Figure 1:
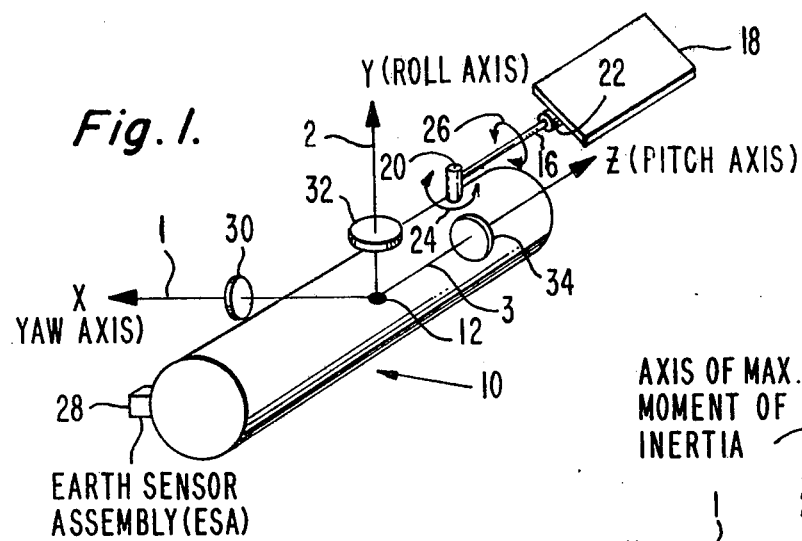
FIG. 1 is a schematic diagram in perspective of a satellite showing the three axes thereof in an embodiment of a substantially zero momentum spacecraft.

Referring to the drawing, there is shown in FIG. 1, a body 10 which may be a spacecraft or satellite of any suitable or desired shape. Extending from the center of mass 12 are three mutually perpendicular spacecraft axes designated as 1, 2, and 3 corresponding to conventionally designated yaw, roll, and pitch axes, respectively. The pitch (3) axis is defined to be that direction in the spacecraft 10 colinear with the normal to the orbit plane when the spacecraft 10 is operating in its intended mission orientation.

The pitch (3) axis is also parallel to axis 16 on which a solar array 18 is mounted. Solar array 18 is asymmetrical about the spacecraft's center of mass 12 and may be rotated by solar array drives (not shown) about pivotal members 20 and 22 in the directions shown by arrows 24 and 26, respectively. Solar array 18, which may also be disposed symmetrically about center of mass 12, is suitably deployed from a stowed position, prior to launch, to an extended position after orbit has been achieved. The solar array 18, upon exposure to the sun, converts solar energy to electrical energy in a manner well known in the art for operation of the spacecraft.

A suitable sensor 28, such as an earth sensor assembly, which upon scanning develops sky/earth and earth/sky transistions is placed on spacecraft 10. In the normal on-orbit orientation of spacecraft 10, sensor 28 senses pitch and roll attitude errors by determining earth disk symmetry with respect to sensor 28, and as is well known in the spacecraft attitude control art, provides means to generate signals representing the attitude errors from a fixed reference point or axis. It should be understood however, that the present invention is concerned with changes in the spin rate or angular momentum of a spacecraft and not with the forces which effect a displacement of the satellite from its intended attitude. Suitable means such as, for example, propulsion devices are used to return a satellite from displaced orbital positions. Such techniques in spacecraft attitude control are well known in the art and form no part of this invention.

The spacecraft 10 may be any of the known types that are (1) spin stabilized, (2) stabilized by a despin arrangement utilizing a momentum bias member such as a momentum wheel despun from the spacecraft body portion or (3) stabilized by an active three axis zero momentum system.

The present embodiment is described for use in a stabilized substantially zero momentum spacecraft. Mounted momentum momentum momentum on spacecraft 10 are three reaction wheels (yaw 30, roll 32 and pitch 34) in such a manner that their axes are parallel to the orthogonal set of body axes 1, 2, 3. Suitable motor controls (not shown) cause wheels 30, 32, 34 to change their speed and/or direction of rotation. As is well known in the spacecraft art, wheels 30, 32, 34 act as torquers or momentum storage devices and impart stability to spacecraft 10 along axes 1, 2, 3 providing the necessary torques and momemtum storage to maintain the spacecraft's attitude. In a situation where an excessive amount of momentum, exceeding the storage capacity of wheels 30, 32, 34, is developed due to, for example, unanticipated and substantial propulsion effects after the spacecraft is in the on-orbit phase, the satellite can no longer function as a zero momemtum spacecraft. Corrections may be made by compensating for the increased momemtum by mass expulsion devices, such as rocket thrusters. In a case where rocket thrusters are not available due to lack of suitable propellant, the spacecraft will go into a tumbling mode in which the satellite will be initially spinning about any axis. However, upon reaching a steady state tumbling condition, spacecraft 10 with spin about the maximum principle axis of the spacecraft. The maximum principle axis is defined as that axis of maximum moment of inertia of the spacecraft. The axis of maximum moment of inertia, or spin axis, is shown as axis 36 in FIG. 2. Axis 36 is displaced, for example, by an angle α from the roll (2) axis and may be at an angle out from the XY plane. The present invention is concerned with the restabilization of such a tumbling satellite by an automatic magnetic torquing system which reduces the excessive momentum and despins the spacecraft to an essentially zero momentum three axis stabilized spacecraft.

A satellite in orbit about the earth is immersed in the earth's magnetic field which extends, generally, from the south to the north poles of the earth. In general, according to the present invention, the magnetic field of the earth is utilized by reacting it with the electromagnetic field of an air core coil or suitably disposed electromagnets to develop a torque to despin the tumbling satellite. Suitable earth sensors and control logic are utilized to provide signals to generate the desired magnetic torque.

Figure 2:
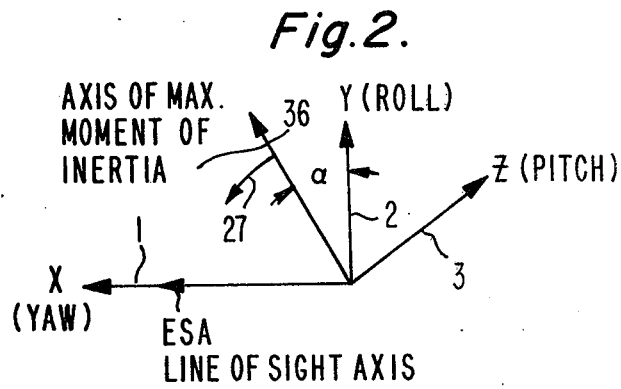
FIG. 2 is a diagram showing the vector relationships of the axis of maximum moment of inertia of a tumbling spacecraft and the line of sight axis of an earth sensor with respect to the three spacecraft axes.
Figure 3:
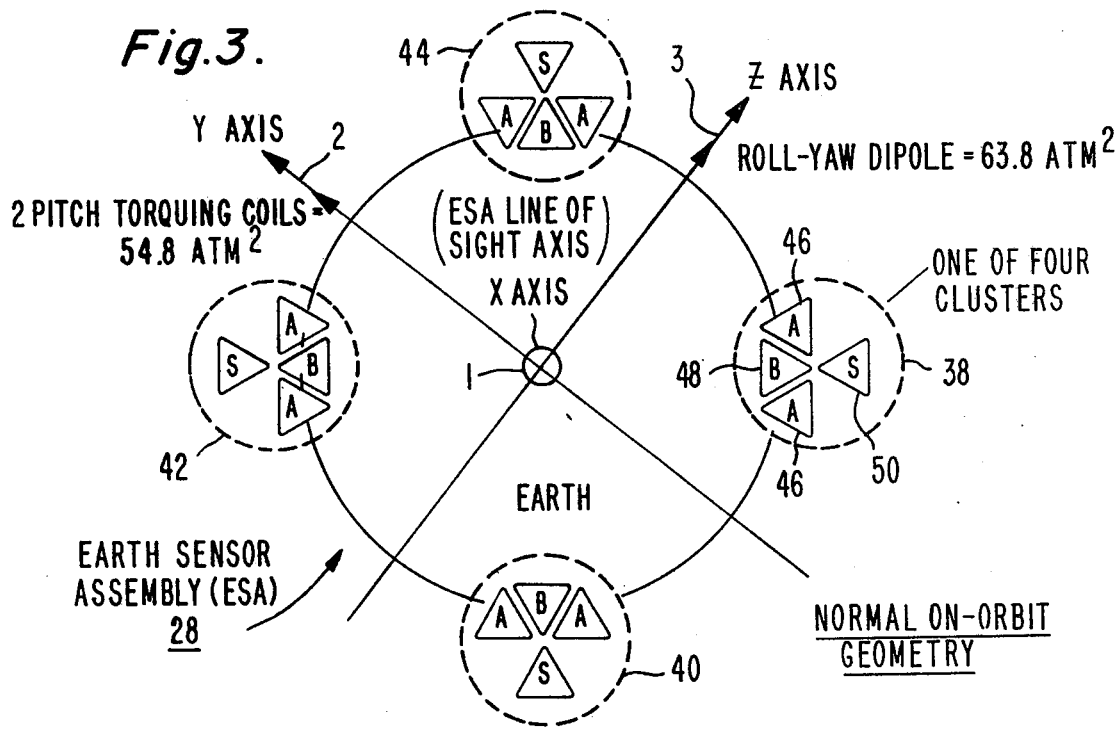
FIG. 3 is a diagram of an earth sensor assembly in its normal on-orbit geometry with the sensor line of sight axis directed toward the center of the earth.

FIG. 3 illustrates Earth Sensor Assembly (ESA) 28 in its normal on-orbit geometry. In this normal orientation, the X (1) axis of the spacecraft 10 is directed toward the earth. The line of sight axis of the ESA 28 is arranged to be colinear with the X (1) axis, as shown in FIG. 2, such that the ESA will be capable of symmetrically sensing the earth's horizon. To be utilized in a tumbling mode, the line of sight axis of ESA 28 may be substantially aligned, as by suitable symmetrical mounting, with the axis 36 of maximum moment of inertia of spacecraft 10. In the absence of nutational motion (cyclic rates transverse to the spin axis), the axis 36 of maximum moment of inertia of spacecraft 10 is always aligned with the spacecraft momentum vector in the steady state condition. Reorientation of the spacecraft spin axis 36 to be colinear with the X (1) axis may be achieved, if necessary, by changing the spacecraft's mass distribution. However, the moment of inertia is still aligned with the momentum vector, but in different spacecraft coordinates. Thus, by aligning the axis 36 of maximum moment of inertia with the ESA line of sight axis, symmetrical scanning of the earth is available in the spacecraft on-orbit orientation or in a tumbling mode.

According to a preferred embodiment of the invention, the maximum principle spin axis 36 of the tumbling spacecraft 10 is reoriented as shown by arrow 27 in FIG. 2 so that the tumble or spin axis 36 is substantially coincident with the ESA 28 line of sight axis. This is accomplished by rotating the solar array 18 such that spin axis 36 will be approximately colinear with the spacecraft X (1) axis. Rotation of solar array 18 changes the moment of inertia of the spacecraft 10 to reorient tumble axis 36 so that symmetrical scanning of the earth by ESA 28 is directed substantially along the spin axis 36 of the tumbling spacecraft 10. It should be understood that such a rotation of the spacecraft to align the spin axis 36 with the line of sight axis of ESA 28 is necessary in an embodiment in which the ESA is not symmetrically mounted with the axis of maximum moment of inertia of the spacecraft 10.

Referring back now to FIG. 3, Earth Sensor Assembly 28, is a static sensor comprising four separate and independent clusters of sensors 38, 40, 42, and 44, respectively, symmetrically disposed about the ESA line of sight axis with one cluster in each of the four quadrants. Any number of clusters suitably symmetrically disposed at any desirable location may be used, however. In a preferred arrangement, each cluster 38, 40, 42 and 44 includes two A sensors designated as 46, one B sensor, designated as 48 and one S sensor designated as 50. In this normal on-orbit configuration the A and B sensors are utilized to detect earth presence and sensor S is used, for example, as a fixed reference point, in a satellite operating under stabilized conditions. Any variation in sensor arrangement or number may be used as long as the selected sensors provide the desired detection of earth presence, in accordance with the present invention. For the tumbling mode, a spin about the X (1) axis places each cluster at about the same "scan" angle with respect to the X (1) axis. The "scan" angle is defined as the angle between the spin axis and the line of sight of the particular sensor.

Figure 4:
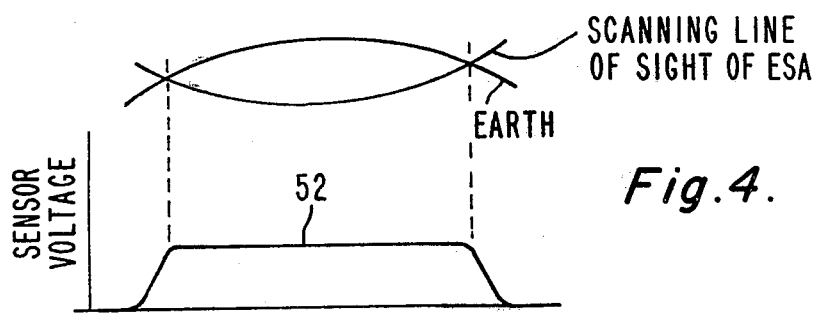
FIG. 4 is a diagram showing the voltage output of an earth sensor utilized in the present invention as it detects the earth/sky transition.

As shown in FIG. 4, as the scanning line of sight of ESA 28 crosses the earth, the ESA "sees" the earth or senses its presence and a voltage output 52 is received from the sensors. When the earth's presence is not sensed, the voltage output 52 falls off. The voltage output from ESA 28 is coupled to the on-board control logic to produce a magnetic torque to despin spacecraft 10, as will be described in detail. It should be understood that due to the spin axis attitude of the spacecraft with respect to the orbit plane there can be portions of the satellite's orbit in which the presence of earth cannot be detected. Earth detection is a function of the scan angle, the orientation of the spin axis with respect to the orbit plane and the spacecraft's orbital altitude. In accordance with the invention, a magnetic torque can be developed to change the spin rate of an orbiting satellite only when the earth's presence can be detected.

Figure 5:
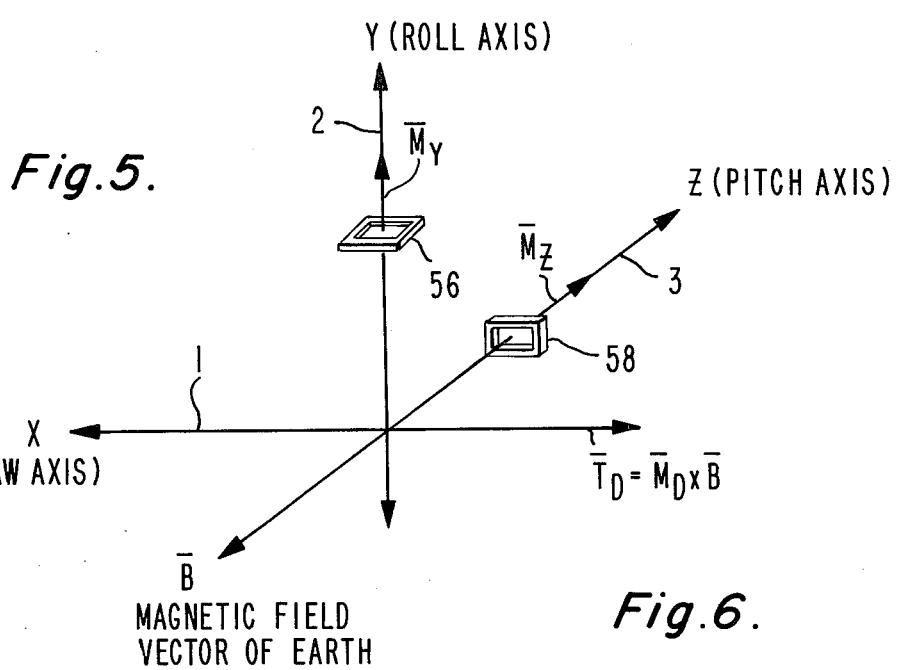
FIG. 5 is a diagram showing the location of magnetic air coils about the roll and pitch axes and the generated magnetic dipoles in accordance with a preferred embodiment of the invention.

As depicted in FIG. 5, there are magnetic torquing coils 56 and 58 located on spacecraft 10 about axes 2 and 3 respectively. Each of coils 56 and 58 comprises and air core with one or more coils and a suitable current activation control (not shown) to provide a suitable signal to energize the coils. Coils 56 and 58 are arranged such that the plane of the air core is perpendicular to axes 2 and 3 respectively. In another embodiment, electromagnets may be used as suitable magnetic torquers rather than the magnetic coils. The output of sensors of ESA 28, controlled by the on-board logic, is coupled to magnetic coils 56, 58 by the current activation control to develop the desired magnetic torque along the spin axis of spacecraft 10. In response to the sensor output and logic control, magnetic coils 56 and 58 develop magnetic dipoles $\overline{M}_y$ and $\overline{M}_z$ respectively. Magnetic dipole or field $\overline{M}_y$ generated at coil 56 is perpendicular to the plane of coil 56 and is directed along the Y (2) axis. Magnetic dipole $\overline{M}_z$ generated at coil 58 is normal to the plane of coil 58 and is directed along the Z (3) axis. A magnetic torque is developed by the interaction of the earth's magnetic field $\overline{(B)}$ and the magnetic dipoles $\overline{M}_y$ and $\overline{M}_z$ generated at coils 56 and 58. The interaction of these fields may be represented by the well known vector relationship $$\overline{T}_D = \overline{M}_D \times \overline{B} \qquad (1)$$

where $\overline{T}_D$ is the magnetic torque developed to despin tumbling satellite 10 and $\overline{M}_D$ is the vectorial sum of dipoles $\overline{M}_y$ and $\overline{M}_z$.

In the configuration illustrated in FIG. 5, the dipoles generated are substantially transverse to the spin axis 36 of the tumbling spacecraft 10, the spin axis 36 having been reoriented in the preferred embodiment to be substantially along the X (1) axis. The magnetic coils 56 and 58 are commutated in response to the output of ESA 28 controlled by the spacecraft logic control to produce magnetic dipoles which develop a torque in the negative X (1) axis direction to reduce the angular momentum and thereby despin the tumbling satellite. Depending upon the direction of the earth's magnetic field, it can be appreciated that dipoles can be generated by suitable logic control to either reduce the angular momentum to despin the spacecraft or increase the momentum to increase the spin rate, i.e., spin-up the satellite. The control of the spin rate and the direction of the developed torque based on the direction of the earth's magnetic field are accomplished by the on-board computer logic, to be described subsequently.

Figure 6:
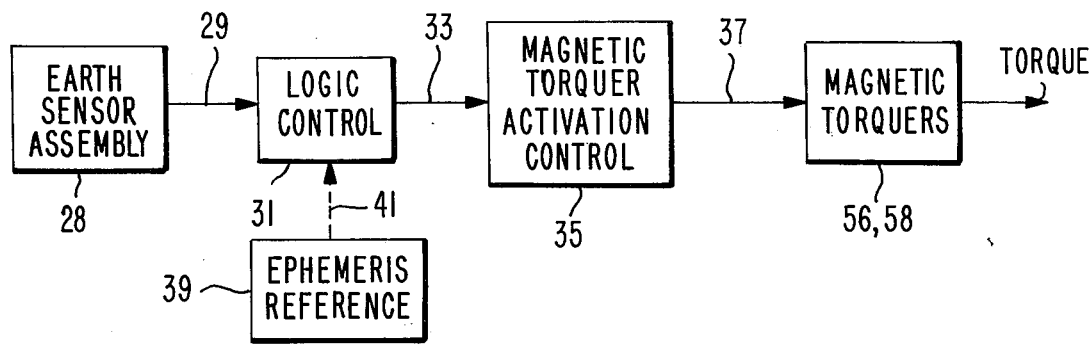
FIG. 6 is a block diagram of a magnetic torquing system illustrating an embodiment of the invention.

Referring to FIG. 6, there is a block diagram illustrating one embodiment of the invention. Earth sensor 28 detects the earth's presence and generates in response to this detection an output signal 29 to a logic control 31. In response to sensor output signal 29, logic control 31 generates a logic output signal 33 to produce a dipole having a magnetic field in the desired direction. As will be described subsequently in the detailing of the logic, logic control 31 includes means for selecting the desired magnetic dipole configuration to produce a desired magnetic torque based upon a priori knowledge of the polarity of the earth's field. In response to output logic signal 33, a magnetic torquer activation control 35, including suitable current activation controls, generates an energizing signal 37 to energize the magnetic torquers 56 and 58 to produce a magnetic torque along the spacecraft spin axis for changing the angular momentum of spacecraft 10 and thereby its spin rate. For a satellite orbiting in a high inclination orbit, as will be explained subsequently, changes in the earth's magnetic field based upon a priori knowledge may be scheduled by an ephemeris reference 39 or other suitable clocks coupled to logic control 31 by an output signal 41 as the satellite passes through the hemispheres.

Figure 7:
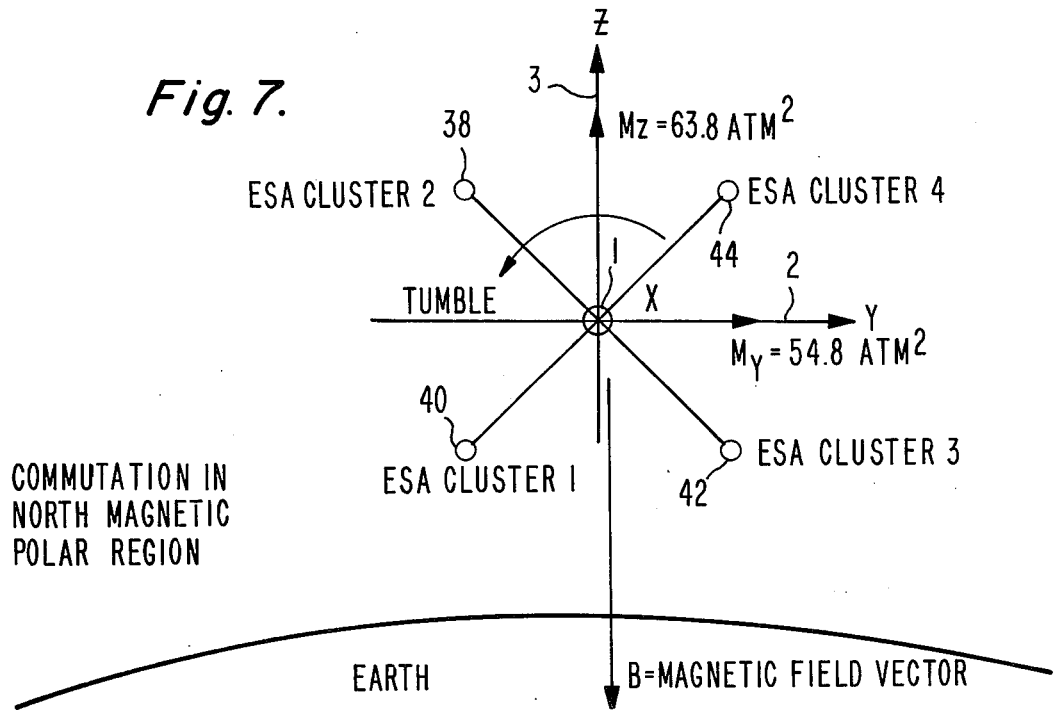
FIG. 7 is a diagram of the magnetic dipoles generated in response to commutation of the coils in the north magnetic polar region according to a preferred embodiment of the invention.

According to the invention, for a spacecraft in a 450 nautical mile circular high inclination orbit inclined at 98° with respect to the equatorial plane, magnetic coil commutation may be achieved, for example, in the north magnetic polar region as shown in FIG. 7. In this particular arrangement, spacecraft 10 is pointing toward the descending node for power reasons. The presence or absence of ESA 28 clusters on the earth (IR spectrum) is also indicative of the phase relationship of the magnetic dipoles with respect to the earth's magnetic field, $\overline{B}$. The coils can be commutated to produce a dipole $\overline{M}_y$ having a strength of, for example, 54.8 ampere turns meter squared (ATM$^2$). A dipole $\overline{M}_z$ can be generated having a strength of, for example, 63.8 ATM$^2$. Such dipoles are sufficient to develop a torque in the negative X (1) axis direction to despin the spacecraft 10, reducing the angular momentum from about 500 in-lb-sec to approximately 30 in-lb-sec. At a momentum of no more than 30 in-lb-sec, the spacecraft can function essentially as a stabilized three-axis zero momentum satellite.

Ideally, it is desirable to have orthogonality between the magnetic dipoles ($\overline{M}_y$ and $\overline{M}_z$) and the earth's magnetic field ($\overline{B}$) so as to maximize the torque according to the relationship $\overline{T}_D = \overline{M}_D \times \overline{B}$. Some inefficiency, however, is to be expected, not only because the vectorial relationships between the ESA 28 lines of sight and the dipoles are not ideal, but also because of the limited resolution (angular) of the commutation (rectification) process.

The logic coupled to the ESA 28 cluster can use earth presence, sky/earth or earth/sky transitions of each cluster 38, 40, 42, 44 as the rectification signal for the coils. In a preferred embodiment, the logic using earth/sky transitions, may be programmed in accordance with the following table:

TABLE 1

| ESA Quadrant | Commutation Logic for Earth/Sky Transition | | | |
|---|---|---|---|---|
| | Northern Hemisphere | | Southern Hemisphere | |
| | $\overline{M}_y$ | $\overline{M}_z$ | $\overline{M}_y$ | $\overline{M}_z$ |
| 1 | + | + | − | − |
| 2 | − | − | + | + |
| 3 | + | − | − | + |
| 4 | − | + | + | − |

It is necessary to reverse the phasing of the magnetic dipoles in the southern magnetic hemisphere in the orbit of high inclination angle because of the reversal of the relationship between the earth's magnetic field, $\overline{B}$, and the earth's presence sensed by the ESA 28. Provision can be made to schedule the despin torque to desirable orbital regions as a function of an on-board ephemeris which can be coupled to the logic control, as previously described by reference to FIG. 6. As the spin axis attitude changes somewhat, the ideal northern and southern magnetic pole regions will be skewed to other anomoly sectors, depending upon the attitude. However, on an orbit average basis, momentum changes to despin the satellite will be possible.

Figure 8A:
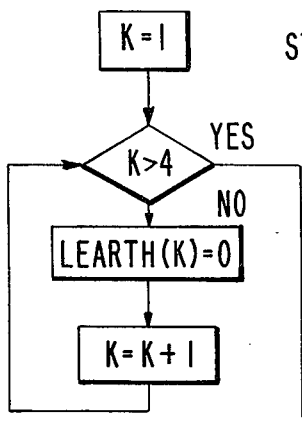
FIGS. 8(a) and 8(b) are flow charts of algorithms for use in a computer to select the desired magnetic dipole configuration according to the method of the present invention.
Figure 8A:
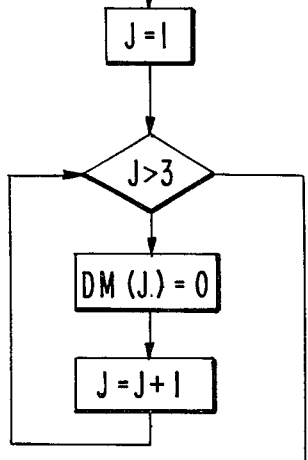
Figure 8B:
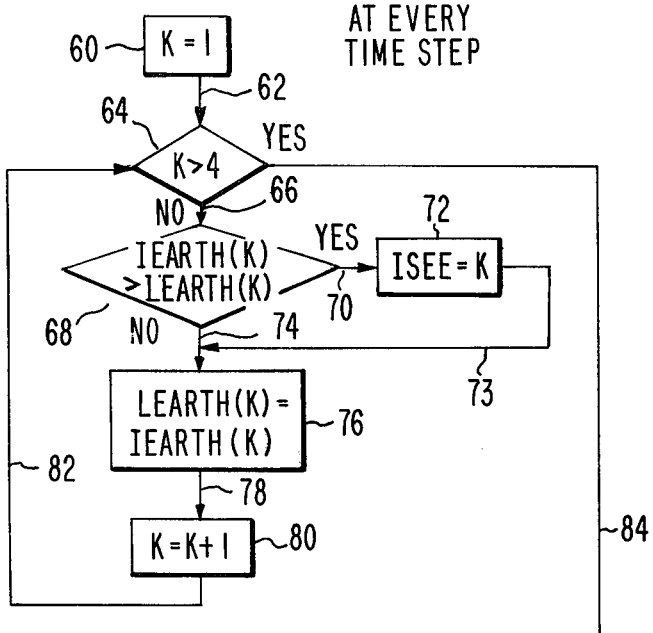
Figure 8B:
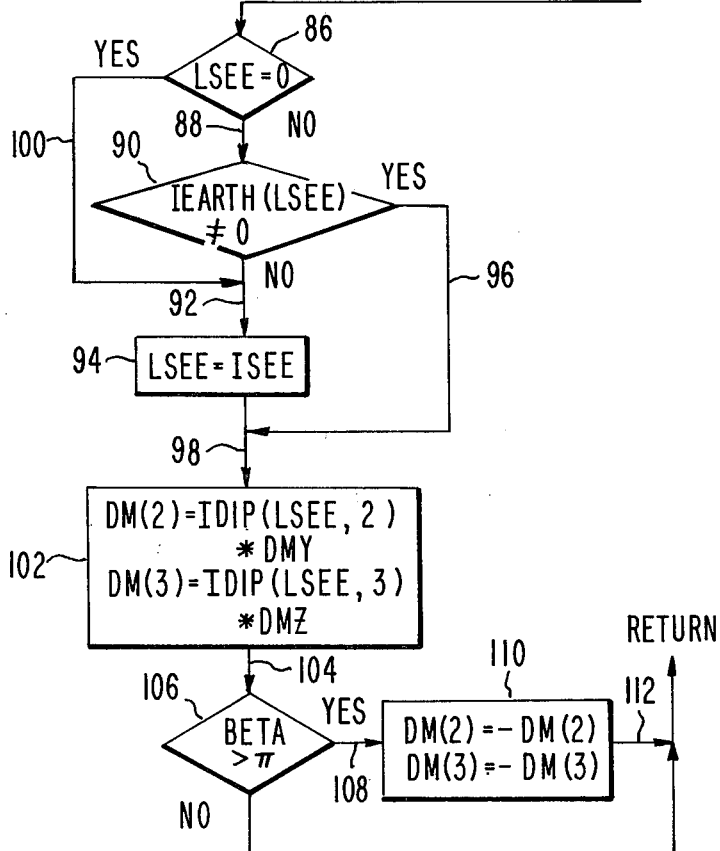

FIGS. 8(a) and 8(b) illustrate flow charts for an algorithm to commutate the magnetic coils for development of a magnetic torque. The flow charts may be used for properly programming a digital computer in a manner well known in the programming art to perform the desired commutations of the coils. The algorithm of FIG. 8(a), in brief, is only utilized in the initialization of the computer logic. This algorithm clears any sensed earth presence information that may be stored in the computer to assure that the dipoles are not activated. The algorithm of FIG. 8(b) provides the steps for selecting the proper dipole configuration according to desired ESA commutation logic. This algorithm is a subroutine used to update the computer with information based upon sensor data at selected time intervals, for example, every half or quarter second. In this particular algorithm no more than two sensors can be used to detect earth presence, but generally any number of sensors can be utilized. Reference may be made to Table 2 for a description of the parameters utilized in the algorithms for a better understanding of the flow charts.

TABLE 2

| Description of Algorithm Parameters | |
|---|---|
| Legend | |
| BETA | orbit angle referenced to AN (Ascending Node) Crossing |
| LEARTH(K) | earth sense index for Quad Segment K (one of four in use) at previous time step. Note: This quantity is a threshold parameter defined as a logical 1 (one) if earth is sensed and a logical 0 (zero) otherwise. |
| IEARTH (K) | earth sense index for Quad Segment K at current time step |
| LSEE | control index designating Quad Segment currently exercising authority over dipole configuration |
| ISEE | sense index designating last Quad Segment to have sensed a sky/earth transition (leading edge horizon crossing) |
| DM(J) | dipole moment values for PTC (J = 2) and RYC (J = 3) assemblies, respectively |
| DMY,DMZ | constants for PTC (Y) and RYC (Z) assembly coils. |
| IDIP(LSEE,J) | coil polarity indices implementing ESA commutation logic |

| LSEE | PTC (Y Axis Coil) J = 2 | RYC (Z Axis Coil) J = 3 |
|---|---|---|
| 1 | +1 | +1 |
| 2 | −1 | −1 |
| 3 | +1 | −1 |
| 4 | −1 | +1 |

Proceeding now to a detailed description of FIG. 8(b), the first operation performed in the flow chart is labeled 60. An integer K, representing one of the four quadrant clusters 38, 40, 42, and 44, is set to 1, representing the first cluster. The program is directed by flow arrow 62 to a decision operation 64, which determines whether or not all four of the quad segments have been examined.

If all four of the quad segments have not been updated (K less than 4), the program is directed by flow arrow 66 to a decision operation 68 in which the earth sense index, IEARTH (K), at the current time step is compared with the earth sense index, LEARTH (K), for the same quad segment at the previous time step. The quantity, LEARTH (K) is a threshold parameter defined as a logical 1 (one) if earth is sensed and a logical 0 (zero) otherwise. If IEARTH (K) is greater than LEARTH (K), the program is directed by flow arrow 70 to operation 72 in which the quad segment to have last sensed a sky/earth transition (leading edge horizon crossing) is set to the quad segment, K, being updated. Flow arrow 73 then directs the program to flow arrow 74. If IEARTH (K) is not greater than LEARTH (K), the program is directed by flow arrow 74 to operation 76 in which the earth sense index for the previous time step is set equal to earth sense index at the current time step. Flow arrow 78 directs the program to operation 80, in which the quad segment is changed to the next successive quad segment. Flow arrow 82 then directs the program back to operation 64.

If at operation 64, all four of the quad segments have been updated (K greater than 4 ), the program is directed by flow arrow 84 to decision operation 86. At operation 86, if the quad segment currently exercising authority over the dipole configuration sensed the earth on the previous time step, the control index will not be zero and the program will be directed by flow arrow 88 to decision operation 90. At 90, if the quad segment being updated is not the quad segment currently exercising authority over dipole configuration, the program is directed by flow arrow 92 to operation 94 where the control index designating the quad segment currently exercising authority over dipole configuration is set equal to the sense index designating the last quad segment to have sensed a sky/earth transition (leading edge horizon crossing). If at operation 90, the quad segment being updated is the quad segment currently exercising authority over dipole configuration, the program is directed by flow arrow 96 to flow arrow 98.

If at operation 86, the quad segment currently exercising authority over the dipole configuration did not sense the earth on the previous time step, the control index will be zero and the program will be directed by flow arrow 100 to flow arrow 92.

Flow arrow 98 directs the program to operation 102 in which the dipole moment values are set equal to the coil polarity indices implementing ESA commutation logic according to TABLE 2 within the constraints of the sensor assembly coils.

Flow arrow 104 directs the program to a decision operation 106 in which the orbit angle ($\beta$) referenced to an ascending node crossing is compared with $\pi$. If $\beta$ is greater than $\pi$, the program is directed by flow arrow 108 to operation 110 in which the polarity established in operation 102 is reversed to account for the changing direction of the earth's magnetic field as the spacecraft circles the earth. The program is then directed by flow arrow 112 to RETURN. If $\beta$ is less than $\pi$, the program is directed by flow arrow 114 to RETURN.

Although the invention has been illustrated by reference to a satellite 10 operating in a circular and high inclination orbit, it should be understood that use of the invention is not limited to circular orbits or to a specific inclination. A high inclination orbit is one in which the angle between the earth's polar axis and the orbit normal is approximately a right angle. Such an orbit causes an orbiting satellite to pass through the strongest portions of the earth's magnetic field. Low inclination orbits generally cause the satellite to pass through portions of the earth's magnetic field that have lower but still useful magnetic field strengths.

According to the invention, when the spacecraft is in a high inclination orbit, having an inclination of nominally 90° (but for practical purposes an inclination in the range from 60° to 120°) despinning of the tumbling spacecraft can be achieved as long as the earth can be detected by the sensors in ESA 28. In such an orbit, the tumbling spacecraft 10 can be despun from any initial spin axis attitude, independently of whether the spin axis lies in, perpendicular to, or skewed to the orbit plane, as long as the sensors can detect the presence of the earth.

In a low inclination or essentially equatorial orbit, the orientation of the spin axis may be such that the direction of the magnetic dipoles is substantially parallel to the earth's magnetic field so that a magnetic torque to despin the spacecraft cannot be generated. In a low inclination orbit, where the spin axis of the tumbling satellite is essentially perpendicular to the orbit plane, a torque to despin the spacecraft cannot be developed. However, when the spin axis is oriented so that it is within the orbit plane such a magnetic torque can be developed. For the low inclination orbit, a phase reversal of the magnetic dipoles occurs when the spin axis projection into the orbit plane coincides with the local vertical. Such a reversal in the phase may be scheduled in the logic control as a function of the ephermeris to account for this reversal and permit the desired magnetic torque as the spacecraft circles the earth.

In either the high inclination or the low inclination orbits, the spin axis 36 of spacecraft 10 is inherently driven toward the orbit plane upon the logic-controlled activation of the magnetic torquers. In the case of a low inclination orbit, the precession of the spin axis 36, inherent to the implementation of the logic-controlled activation of the magnetic torquers, provides a favorable condition to develop a magnetic torque along the spin axis. In the particular situation where the spin axis is essentially perpendicular to the orbit plane, a desired magnetic torque to change the satellite spin rate cannot be produced, as discussed previously. However, upon activation of the magnetic torquers by the desired sensor data and logic control, a torque is developed which changes the attitude or orientation of the spin axis, but initially not the spin rate. This torque precesses the spin axis 36 in the direction of the orbit plane. As the spin axis 36 is driven toward the orbit plane, the magnetic torque to change the spacecraft spin rate can be developed, with increasing effectiveness as the spin axis nears the orbit plane. Thus, changing the spin rate of an orbiting satellite can be achieved by the use of the herein described magnetic torquing system for an orbiting satellite in a high or low inclination orbit.

It should now be appreciated that a tumbling spacecraft 10 may be despun to essentially zero momentum by the utilization of an autonomous magnetic torquing system without the use of gyros or magnetometers. As the total momentum of a spacecraft decreases, the effects of internal and external influences to produce nutation increase. To compensate for nutation that may be caused by the torques imposed upon the spacecraft to produce changes in the spin rate, the system may use either active or passive nutation dampers. For example, wheel 32 about the Y (2) axis and wheel 34 about the Z (3) axis, both perpendicular to the X (1) axis may be employed in a manner similar to the Perkel nutation damper described in U.S. Pat. No. 3,591,108 to reduce nutation.

Although the invention has been described as a means for changing the angular momentum of a spacecraft orbiting the earth, it is to be appreciated that the application of the invention is not limited to earth orbits. The invention may be utilized in the environment of any planet or celestial body having an ambient magnetic field. A satellite orbiting such a celestial body may have its spin rate changed by the interaction of the body's magnetic field with the magnetic dipoles developed by the magnetic torquing system of the present invention to produce the desired magnetic torque.

Although the invention has been described in an embodiment of a closed loop system to change the spin rate of a spacecraft in a tumbling mode, the invention is not limited to a situation in which the uncontrolled tumbling is anticipated. A spacecraft, as herein described in the preferred embodiment, is provided with the logic control 31 (FIG. 6) in accordance with the algorithm shown in FIGS. 8(a) and (b) coupled to sensors and magnetic torquers on board the spacecraft to counteract excessive momentum to provide thereby stability to the spacecraft by preventing the spacecraft from going into a tumbling mode. However, it should be understood that a satellite which does not include the logic control described for anticipating possible excessive increases in momentum can be restabilized after the satellite goes into the tumbling mode. The spacecraft, including an on-board computer for its control and operation, may have its logic control reprogrammed or supplemented with additional programming by suitable signals from a ground station. The reprogrammed or supplementally programmed logic may include an algorithm such as described with reference to FIGS. 8(a) and 8(b) to change the spin rate or to "detumble" the spacecraft. The so-modified logic can be activated to commence the despinning of the spacecraft by a suitable ground station signal. It should be understood, however, that upon activation of the modified logic, no interface is needed with a ground station to change the spin rate of the spacecraft. Such despinning is achieved by the logic controlled sensors and magnetic torquers on board the satellite to provide a magnetic torque along the spin axis of the spacecraft to change the spacecraft's angular momentum and thereby the spin rate.

What is claimed is:

1. A magnetic torquing system in a closed-loop system in a spacecraft orbiting a celestial body for automatically changing the spacecraft angular momentum about the spin axis to thereby control the spin rate of the spacecraft, said celestial body having an ambient magnetic field, comprising:
    a. magnetic torquing means oriented in said spacecraft to produce when energized a magnetic dipole substantially transverse to the spin axis of said spacecraft;
    b. celestial body sensor means mounted on said spacecraft for sensing the celestial body including means for orienting said spin axis substantially colinear with the line of sight axis of said sensor means for symmetrical scanning of said celestial body, said sensor means generating in response to the detection of the celestial body an output signal;
    c. logic means coupled to said sensor means for generating in response to said sensor output signal a logic output signal, said logic output signal representing a selected desired magnetic dipole configuration; and
    d. energizing means coupled to said logic means for generating in response to said logic output signal a signal for energizing said magnetic torquing means such that the magnetic dipole generated therefrom reacts with the magnetic field of the celestial body to produce a magnetic torque along the spin axis of said spacecraft to change the spacecraft angular momentum and thereby the spin rate of said spacecraft.

2. A system according to claim 1, wherein said celestial body is the earth having a magnetic field extending essentially from the earth's south pole to the earth's north pole and wherein said celestial body sensor means comprises earth sensors.

3. A system according to claim 2, wherein said spacecraft is orbiting in a high inclination orbit and wherein said logic means includes means for scheduling the reversal of the earth's magnetic field between the earth's northern and southern hemispheres such that a desired dipole polarity can be selected to develop said magnetic torque, whereby said magnetic torque is developed independently of the orientation of said spin axis with respect to said orbit plane.

4. A system according to claim 2, wherein said spacecraft is orbiting in a low inclination orbit, and wherein said logic means includes means for scheduling the phase reversal of the magnetic dipoles occurring when the spin axis projection into the orbit plane coincides with the local vertical as said spacecraft orbits the earth such that a desired dipole polarity can be selected to develop said magnetic torque, whereby upon energizing said magnetic torquing means the spin axis is inherently driven toward the orbit plane.

5. A system according to claim 2, wherein said orbiting spacecraft is in an uncontrolled tumbling mode spinning about the maximum principal axis of the spacecraft, and wherein said logic means includes means for selecting the desired dipole polarity such that the magnetic torquing means is energized to produce a magnetic torque of substantially opposite direction to the spacecraft angular momentum along the spin axis to reduce the spin rate of the spacecraft such that said spacecraft is essentially stabilized.

6. A system according to claim 2, wherein said orbiting spacecraft is spinning in an essentially stabilized mode, and wherein said logic means includes means for selecting the desired dipole polarity with respect to the earth's magnetic field such that the magnetic torquing means is energized to produce a magnetic torque substantially in the direction of the spacecraft angular momentum along the spin axis to increase the spin rate of said spacecraft.

7. A system according to claim 2, wherein said magnetic torquing means comprises at least one air core coil.

8. A system according to claim 2, wherein said earth sensor means comprises a cluster of four sensors disposed symmetrically around the line of sight axis of said sensor means, each of said clusters including at least one sensor for detecting the earth.

9. A system according to claim 2, wherein said means for orienting said spin axis substantially colinear with the line of sight axis of said sensor means comprises means for rotating said spacecraft such that the distribution of spacecraft mass is changed to reorient the spin axis.

10. A method for magnetically torquing in a closed-loop system a spacecraft orbiting a celestial body to automatically change the spacecraft angular momentum about the spin axis to thereby control the spin rate of the spacecraft, said celestial body having an ambient magnetic field, comprising the steps of:
    a. sensing said celestial body by sensor means oriented on said spacecraft such that said spin axis is substantially colinear with the line of sight axis of said sensor means, said sensor means generating in response to the detection of the celestial body an output signal;
    b. generating in response to said sensor output signal a logic output signal by logic means coupled to said sensor means, said logic output signal representing a selected desired magnetic dipole configuration;
    c. generating in response to said logic output signal a signal for energizing magnetic torquing means by energizing means coupled to said logic means; and
    d. magnetically torquing said spacecraft by energizing said torquing means to produce a magnetic dipole to react with the magnetic field of said celestial body to generate a torque along the spin axis of the spacecraft to change the spacecraft angular momentum and thereby the spin rate of said spacecraft.

11. A method according to claim 10, wherein said celestial body is the earth having a magnetic field extending essentially from the earth's south pole to the earth's north pole and wherein said celestial body sensor means comprises earth sensors.

12. A method according to claim 11, wherein said spacecraft is orbiting in a high inclination orbit and wherein said logic means includes means for scheduling the reversal of the earth's magnetic field between the earth's northern and southern hemispheres such that a desired dipole polarity can be selected to develop said magnetic torque, whereby said magnetic torque is developed independently of the orientation of said spin axis with respect to said orbit plane.

13. A method according to claim 11, wherein said spacecraft is orbiting in a low inclination orbit, and wherein said logic means includes means for scheduling the phase reversal of the magnetic dipoles occurring when the spin axis projection into the orbit plane coincides with the local vertical as said spacecraft orbits the earth such that a desired dipole polarity can be selected to develop said magnetic torque, whereby upon energizing said magnetic torquing means the spin axis is inherently driven toward the orbit plane.

14. A method according to claim 11, wherein said orbiting spacecraft is in an uncontrolled tumbling mode spinning about the maximum principal axis of the spacecraft, and wherein said logic means includes means for selecting the desired dipole polarity such that the magnetic torquing means is energized to produce a magnetic torque of substantially opposite direction to the spacecraft angular momentum along the spin axis to reduce the spin rate of the spacecraft such that said spacecraft is essentially stabilized.

15. A method according to claim 11, wherein said orbiting spacecraft is spinning in an essentially stabilized mode, and wherein said logic means includes means for selecting the desired dipole polarity with respect to the earth's magnetic field such that the magnetic torquing means is energized to produce a magnetic torque substantially in the direction of the spacecraft angular momentum along the spin axis to increase the spin rate of said spacecraft.

16. A method according to claim 11, wherein said magnetic torquing means comprises at least one air core coil.

17. A method according to claim 11, wherein said earth sensor means comprises a cluster of four sensors disposed symmetrically around the line of sight axis of said sensor means, each of said clusters including at least one sensor for detecting the earth.

18. A method according to claim 11, wherein said means for orienting said spin axis substantially colinear with the line of sight axis of said sensor means comprises means for rotating said spacecraft such that the distribution of spacecraft mass is changed to reorient the spin axis.

* * * * *

UNITED STATES PATENT OFFICE
CERTIFICATE OF CORRECTION

PATENT NO. : 4,114,841

DATED : September 19, 1978

INVENTOR(S) : Ludwig Muhlfelder and Roger Benson Hogan

It is certified that error appears in the above-identified patent and that said Letters Patent are hereby corrected as shown below:

The following statement should be read at column 1, line 5:

"The Government has rights in this invention pursuant to Contract No. F04701-75-C-0120 awarded by the Department of the Air Force."

Signed and Sealed this

Twelfth Day of December 1978

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,114,841

DATED : September 19, 1978

INVENTOR(S): Ludwig Muhlfelder et al.

It is certified that error appears in the above-identified patent and that said Letters Patent is hereby corrected as shown below:

Title Page, change "[75] Inventors: Ludwig Muhlfelder, Livingston; Robert Benson Hogan, Cinnaminson, both of N.J." to --[75] Inventors: Ludwig Muhlfelder, Livingston; Roger Benson Hogan, Cinnaminson, both of N.J.--.

Signed and Sealed this

Twenty-seventh Day of November 1979

[SEAL]

Attest:

RUTH C. MASON
Attesting Officer

LUTRELLE F. PARKER
Acting Commissioner of Patents and Trademarks